(12) United States Patent
Gadd et al.

(10) Patent No.: US 8,398,486 B2
(45) Date of Patent: Mar. 19, 2013

(54) CREATING A TUNNEL BETWEEN VIRTUAL UNIVERSES

(75) Inventors: Jamie R. Gadd, Watsonia (AU); Martin Tan, Melbourne (AU); Christopher B. K. Yeoh, Tranmere (AU)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 12/819,282

(22) Filed: Jun. 21, 2010

(65) Prior Publication Data
US 2011/0312416 A1 Dec. 22, 2011

(51) Int. Cl.
*A63F 9/24* (2006.01)
(52) U.S. Cl. .......................... 463/32; 463/31
(58) Field of Classification Search .................... 463/32, 463/31
See application file for complete search history.

(56) References Cited

U.S. PATENT DOCUMENTS

| | | | |
|---|---|---|---|
| 5,982,372 A | 11/1999 | Brush, II et al. | |
| 6,488,283 B1 | 12/2002 | Grundy | |
| 6,767,287 B1 * | 7/2004 | Mcquaid et al. | 463/42 |
| 8,291,218 B2 * | 10/2012 | Garcia et al. | 713/160 |
| 2009/0037905 A1 | 2/2009 | Hamilton, II et al. | |
| 2009/0089684 A1 | 4/2009 | Boss et al. | |
| 2010/0332827 A1 * | 12/2010 | Garcia et al. | 713/168 |

OTHER PUBLICATIONS

Grant, H. et al., "Simulation Modeling with Artificial Reality Technology (SMART): An Integration of Virtual Reality and Simulation Modeling", Proceedings of the 1998 Winter Simulation Conference, pp. 437-431.
Ahmed, H. et al., "A Framework for Interaction Interoperability in X3D Mobile Collaborative Virtual Environments", CD Proceedings of the 6th International Conference on Informatics and Systems (INFOS 2008), Mar. 27-29, 2008, Cairo, Egypt, pp. MM-84-MM-92.
Fuhrmann, A. et al., "Real-Time Techniques For 3D Flow Visualization", Proceedings of the conference on Visualization '98, 1998; Institute of Computer Graphics, Vienna Unviersity of Technology, Karlsplatz 13/186, A-1040 Vienna, Austria, 8 pages.
"Open Grid Protocol Enables Avatars to Teleport between Second Life and OpenSim Virtual Worlds", IBM Press Release, Jul. 8, 2008, 2 pages.

* cited by examiner

*Primary Examiner* — Pierre E Elisca
(74) *Attorney, Agent, or Firm* — William E. Scheisser; Keohane & D'Alessandro, PLLC

(57) ABSTRACT

Embodiments of this invention create a mechanism for visual and other communication between two or more separate/distinct 3-dimensional virtual universes (VUs) akin to a "wormhole" or "tunnel". Additionally, embodiments of the present invention allow a mechanism for a player to walk through such a tunnel, logging out from a first VU and logging into a second VU. Embodiments of the present invention utilize streaming video abilities in both virtual universes and the capability to capture output in a useable format and convert to a d streaming video standard.

23 Claims, 7 Drawing Sheets

CREATING A TUNNEL BETWEEN VIRTUAL UNIVERSES

TECHNICAL FIELD

The present invention generally relates to Virtual Universes (VUs). Specifically, the present invention relates to the creation of a tunnel between two distinct VUs for viewing, interacting, and/or traveling between the VUs.

BACKGROUND

VUs are computer-based simulated environments intended for its users or residents to inhabit and interact via avatars, which are personas or representations of the users of the virtual universes. These types of virtual universes are now most common in multiplayer online games, such as Second Life®, which is a trademark of Linden Research Inc. in the United States. Avatars in these types of virtual universes, which can number well over a million, have a wide range of business and social experiences. VUs are generally independent, distinct environments that do not allow for interaction among one another.

SUMMARY

Embodiments of this invention create a mechanism for visual and other communication between two or more separate/distinct 3-dimensional virtual universes akin to a "wormhole" or "tunnel". Additionally, embodiments of the present invention allow a mechanism for a player to walk through such a tunnel, logging out from a first VU and logging into a second VU. Embodiments of the present invention utilize streaming video abilities in both virtual universes and the capability to capture output in a useable format and convert to a streaming video standard.

A first aspect of the present invention provides a method for creating a tunnel between virtual universes (VUs), comprising: capturing a first 3-dimensional output from a first computer connected to a first VU as a first 2-dimensional screen image; converting the first 2-dimensional screen image into a first frame; displaying the first frame on a first landmark in the first VU; and generating a first tunnel opening to a second VU using the first frame as displayed on the first landmark.

A second aspect of the present invention provides a system for creating a tunnel between virtual universes (VUs), comprising: a bus; a processor coupled to the bus; a memory medium coupled to the bus, the memory medium comprising instructions to: capture a first 3-dimensional output from a first computer connected to a first VU as a first 2-dimensional screen image; convert the first 2-dimensional screen image into a first frame; display the first frame on a first landmark in the first VU; and generate a first tunnel opening to a second VU using the first frame as displayed on the first landmark.

A third aspect of the present invention provides a computer program product for creating a tunnel between virtual universes (VUs), the computer program product comprising a computer readable storage media, and program instructions stored on the computer readable storage media, to: capture a first 3-dimensional output from a first computer connected to a first VU as a first 2-dimensional screen image; convert the first 2-dimensional screen image into a first frame; display the first frame on a first landmark in the first VU; and generate a first tunnel opening to a second VU using the first frame as displayed on the first landmark.

A fourth aspect of the present invention provides a method for deploying a system for creating a tunnel between virtual universes (VUs), comprising: providing a computer infrastructure having functionality to: capture a first 3-dimensional output from a first computer connected to a first VU as a first 2-dimensional screen image; convert the first 2-dimensional screen image into a first frame; display the first frame on a first landmark in the first VU; and generate a first tunnel opening to a second VU using the first frame as displayed on the first landmark.

BRIEF DESCRIPTION OF THE DRAWINGS

These and other features of this invention will be more readily understood from the following detailed description of the various aspects of the invention taken in conjunction with the accompanying drawings in which.

Figure 1:
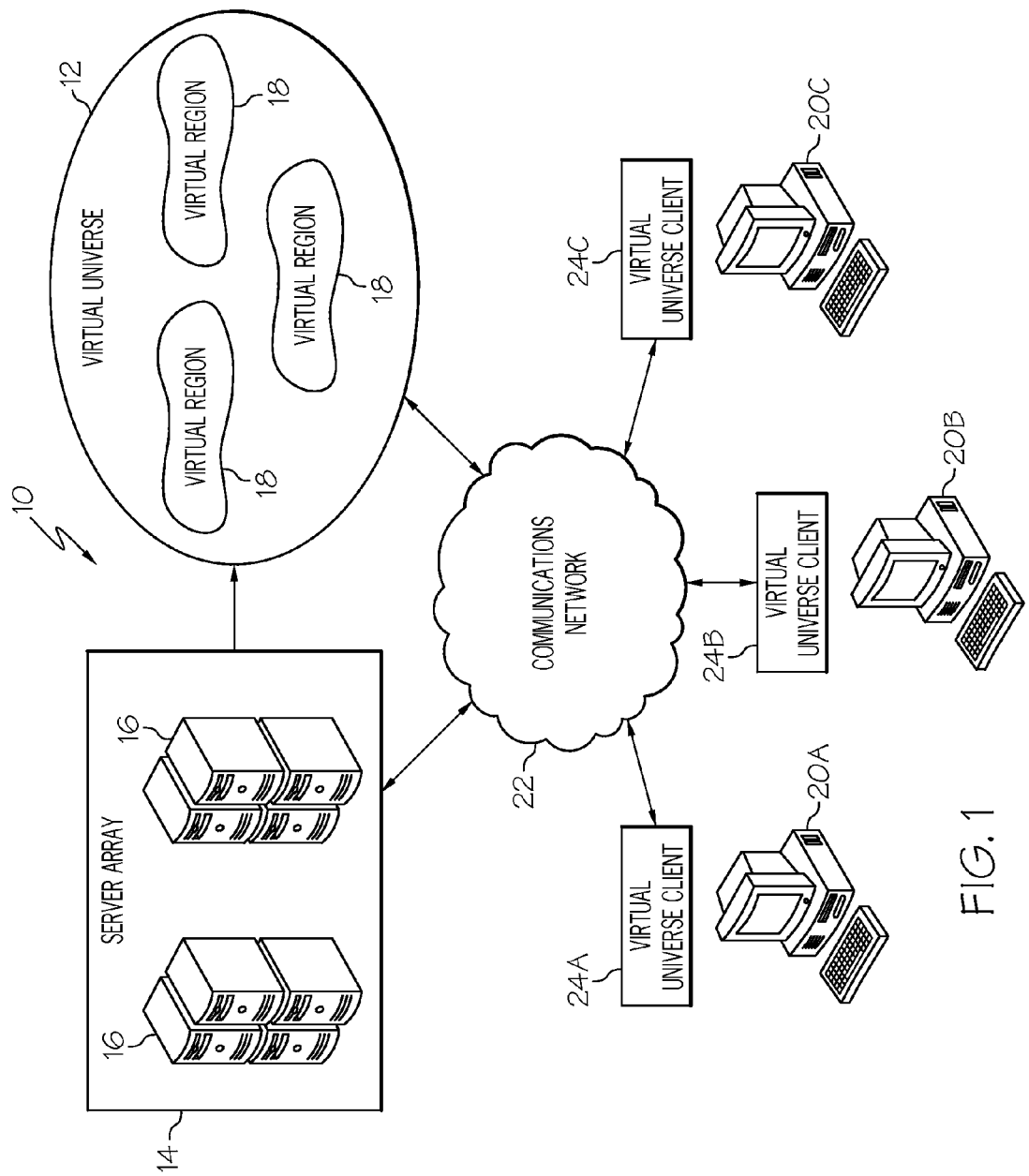
FIG. 1 shows a high-level schematic diagram showing a networking environment for providing a virtual universe according to one embodiment of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Embodiments of this invention create a mechanism for visual and other communication between two or more separate/distinct 3-dimensional virtual universes (VU) akin to a "wormhole" or "tunnel". Additionally, embodiments of the present invention allow a mechanism for a player to walk through such a tunnel, logging out from a first VU and logging into a second VU. Embodiments of the present invention utilize streaming video abilities in both virtual universes and the capability to capture output in a useable format and convert to a streaming video standard.

This solution utilizes two computers to set up a tunnel between VU A and VU B. Computer 1 will take output from a client connected to VU A and capture the 3-dimensional (3D) output as a 2-dimensional (2D) screen image, which then becomes a frame to be carried in the appropriate streaming video format to be displayed on a landmark or object which acts as the tunnel opening in VU B. The same situation is reversed on Computer 2 so that output is taken from a client connected to VU A and the 3D output captured as a 2D screen image, which then becomes a frame to be carried in the appropriate streaming video format to be displayed on a landmark or object, acting as the other tunnel opening in VU A. The resulting effect of these parallel tasks is that an avatar in VU A, within sufficient proximity to view the tunnel, will be able to view activities occurring within sufficient proximity to the Computer 2 in VU B and vice versa for an avatar located in VU B within sufficient proximity of the Computer 1. A mechanism to detect collision with an avatar and a tunnel will use a link to log out the user of that world and log into the other world in the location of the tunnel opening, effectively giving the impression of traversing a tunnel between VUs. It should be appreciated that although this example refers to two computers the present invention can accommodate any quantity thereof.

FIG. 1 shows a high-level schematic diagram showing a networking environment 10 for providing a virtual universe (VU) 12 according to one embodiment of this invention in which a service for providing tunnel creation in a virtual universe can be utilized. As shown in FIG. 1, networking environment 10 comprises a server 14, which may be an array or grid of multiple servers 16 each responsible for managing a portion of virtual real estate within VU 12. A virtual universe provided by a multiplayer online game, for example, can employ thousands of servers to manage all of the virtual real estate. The virtual content of VU 12 is comprised of a number of objects, each having associated texts/scripts, defined in a programming language readable by VU 12. The virtual content is managed by server 14 and may show up in VU 12 as one or more virtual regions 18. Like the real world, each virtual region 18 within VU 12 comprises a landscape having virtual content, such as buildings, stores, clubs, sporting arenas, parks, beaches, cities, and towns, all created by administrators or residents of the virtual universe that are represented by avatars. These examples of virtual content are only illustrative of some things that may be found in a virtual region and are not limiting. Furthermore, the number of virtual regions 18 shown in FIG. 1 is only for illustration purposes, and those skilled in the art will recognize that there may be many more regions found in a typical virtual universe, or even only one region in a small virtual universe. FIG. 1 also shows that users operating computers 20A-20C (hereinafter referred to generally as 20) interact with VU 12 through a communications network 22 via virtual universe clients 24A-24C (hereinafter referred generally as 24) that reside in computers 20, respectively. Below are further details of VU 12, server 14, and virtual universe client 24.

One of the ways that users or administrators can interact with the virtual universe is to create virtual content for the virtual universe. An illustrative but non-limiting listing of virtual content that can be created includes items such as apparel for avatars, animations for a multitude of purposes (e.g., advertisements, instructional material, etc.), avatar accessories (e.g., jewelry, hairpieces, clothing, etc.), scripts for performing certain functions in the virtual universes, building components, avatar appearance features, recreational equipment (e.g., bicycles), automobiles, etc. As will be further described herein, embodiments of this invention are directed to providing a tunnel creation between VUs.

Figure 2:
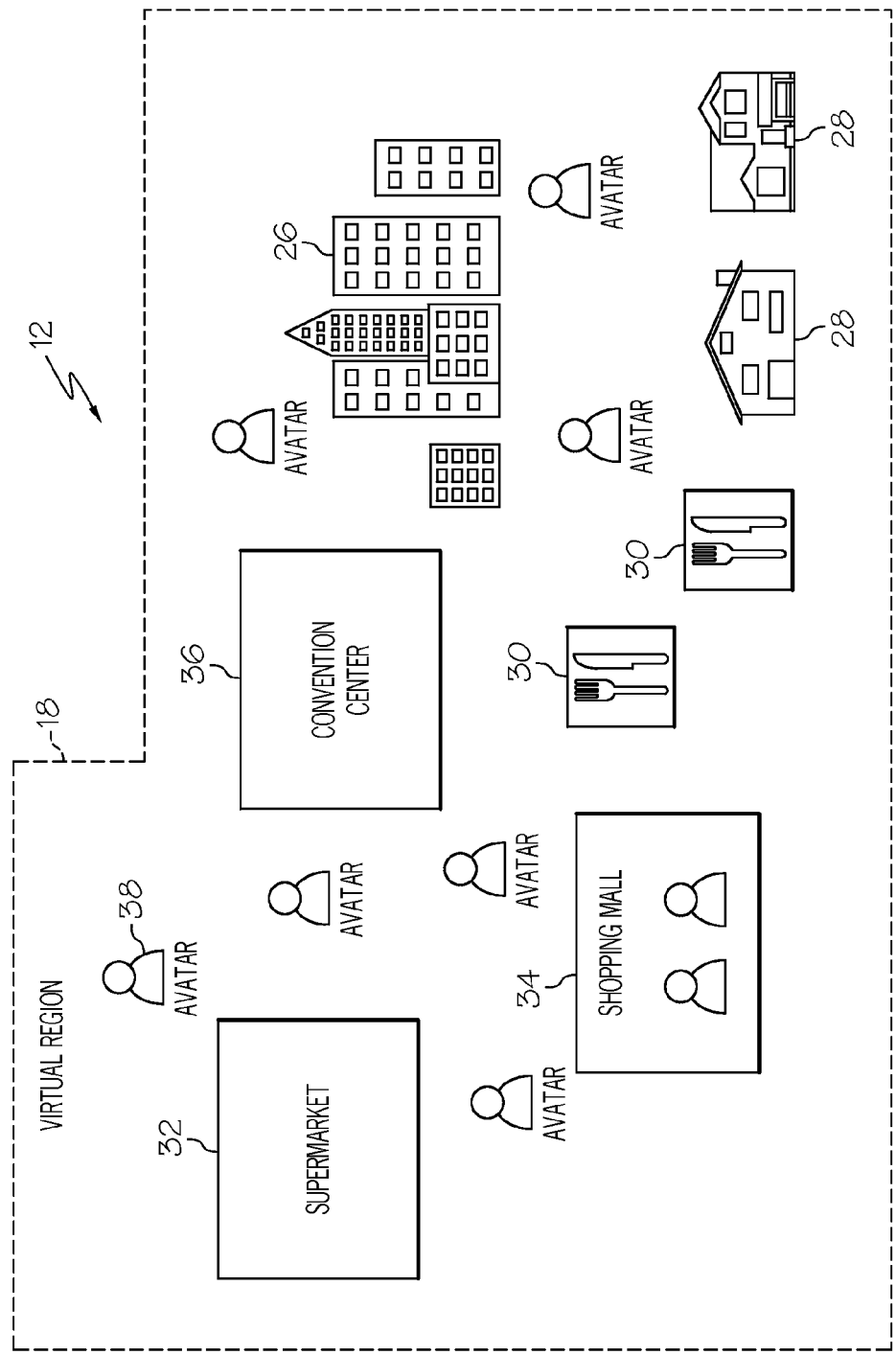
FIG. 2 shows a more detailed view of a virtual region shown in the virtual universe of FIG. 1.

FIG. 2 shows a more detailed view of what one virtual region 18 in VU 12 may comprise. As an example, virtual region 18 shown in FIG. 2 comprises a downtown office center 26, homes 28, restaurants 30, a supermarket 32, a shopping mall 34 for shopping, and a convention center 36 for meetings and various conventions. Residents or avatars 38 which, as mentioned above, are personas or representations of the users of the virtual universe, roam all about the virtual region by walking, driving, flying, or even by teleportation or transportation, which is essentially moving through space from one point to another, more or less instantaneously. These examples of virtual content in virtual region 18 shown in FIG. 2 are only illustrative of some items that may be found in a virtual region and those skilled in the art will recognize that these regions can have more virtual content that can be found in the real world, as well as things that do not presently exist in the real world.

Figure 3:
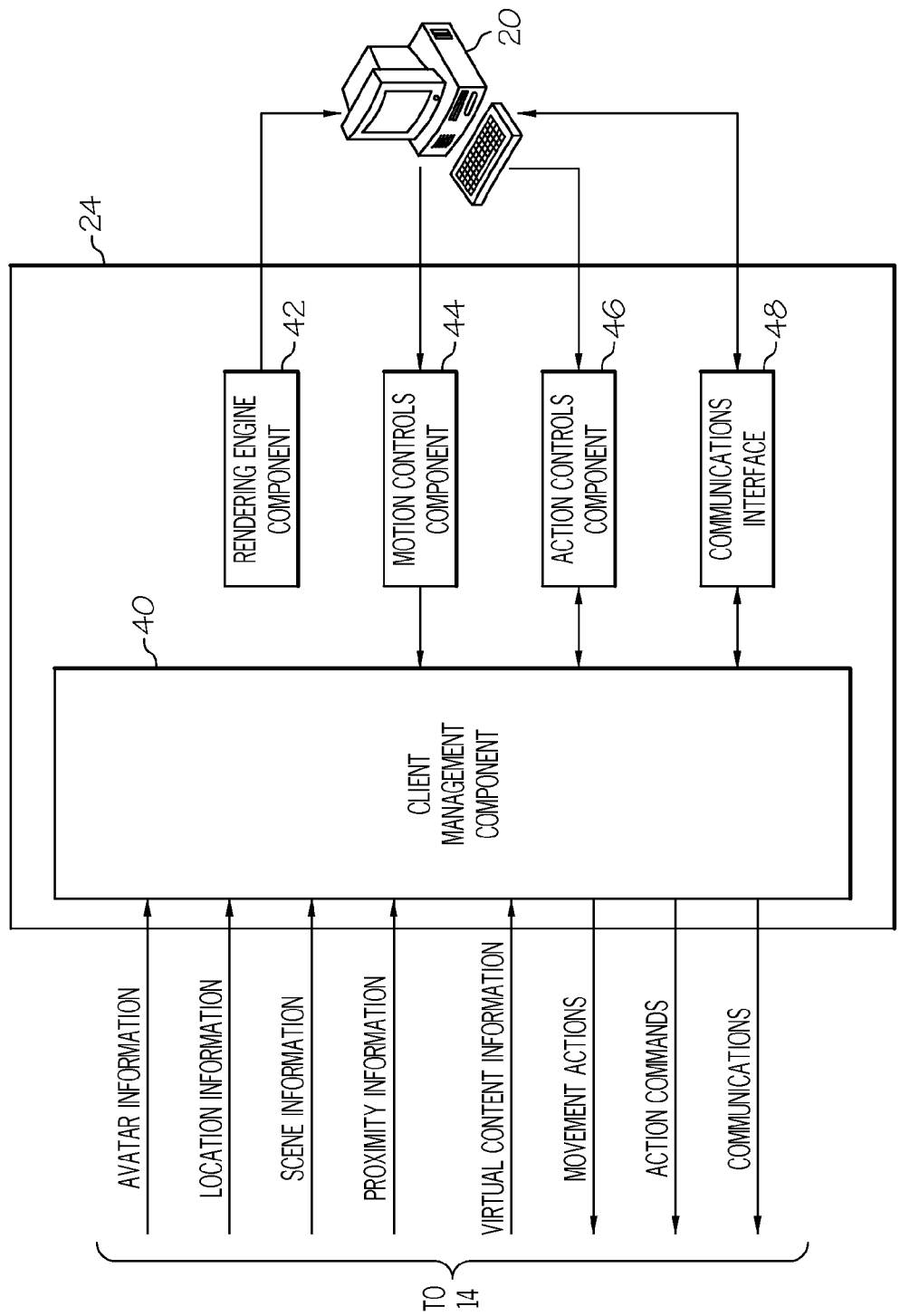
FIG. 3 shows a more detailed view of the virtual universe client shown in FIG. 1.

FIG. 3 shows a more detailed view of virtual universe client 24 shown in FIG. 1. Virtual universe client 24, which enables users to interact with VU 12, comprises a client management component 40, which manages actions, commands, and communications made by a user through computer 20, and information received from the virtual universe through server 14. A rendering engine component 42 enables the user of computer 20 to visualize his or her avatar within the surroundings of the particular region of VU 12 where the avatar is presently located. As will be further described herein, rendering engine 42 receives virtual content in VU 12 and renders it for display to the user of computer 20.

A motion controls component 44 enables the user's avatar(s) to make movements through the virtual universe. In one embodiment, movements through the virtual universe can include, for example, gestures, postures, walking, running, driving, flying, etc. An action control component 46 enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of VU 12 through modalities such as chatting, instant messaging, gesturing, talking, and electronic mail (email).

FIG. 3 shows the various types of information received by client management component 40 from the virtual universe through server 14. In particular, client management component 40 receives avatar information about the avatars that are in proximity to the user's avatar. In addition, client management component 40 receives location information about the area that the user's avatar is near (e.g., what region or land the avatar is in), as well as scene information (e.g., what the avatar sees). Client management component 40 also receives proximity information, which contains information on what the user's avatar is near, and virtual content information, which is information about the objects, texts, and scripts of the virtual content renderable in the virtual universe. FIG. 3 also shows the movement commands and action commands that are generated by the user and sent to the server via client management component 40, as well as the communications that can be sent to the users of other avatars within the virtual universe.

Figure 4:
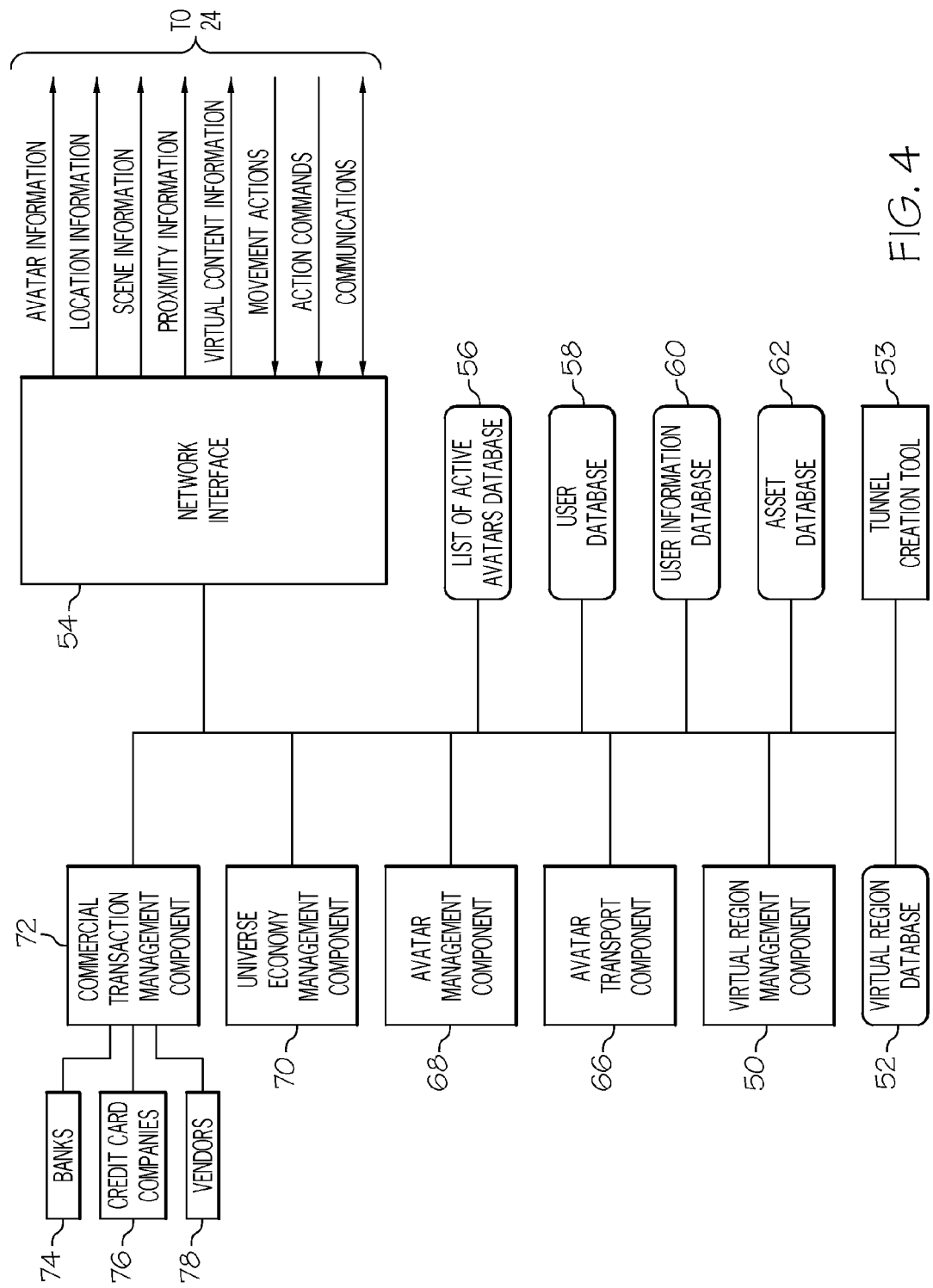
FIG. 4 shows a more detailed view of some of the functionalities provided by the server shown in FIG. 1.

FIG. 4 shows a more detailed view of some of the functionalities provided by server 14 shown in FIG. 1. In particular, FIG. 4 shows a virtual region management component 50 that manages a virtual region(s) within the virtual universe. Virtual region management component 50 manages what happens in a particular region, such as the type of landscape in that region, the number of homes, commercial zones, boutiques, streets, parks, restaurants, etc. Those skilled in the art will recognize that virtual region management component 50 can manage many other facets within the virtual region.

FIG. 4 shows a network interface 54 that enables server 14 to interact with virtual universe client 24 residing on computer 20. In particular, network interface 54 communicates avatar, location, scene, proximity, and virtual content information to the user through virtual universe client 24. The network interface receives movement and action commands, as well as communications from the user via virtual universe client 24.

FIG. 4 also shows a tunnel creation tool 53, which provides the capability to create a mechanism for visual and other communication between two or more separate 3-dimensional virtual universes akin to a "wormhole" or "tunnel". Additionally, embodiments of the present invention allow a mechanism for a player to walk through such a tunnel, logging out from the first world and logging into the second world. This solution only utilizes streaming video abilities in both virtual universes and the capability to capture output in a useable format and convert to the d streaming video standard.

As shown in FIG. 4, there are several different databases for storing information. In particular, virtual region database 52 stores information on all of the specifics in the virtual region that virtual region management component 50 is managing. Virtual region database 52 contains metadata information about the objects, texts, and scripts associated with the virtual content in the virtual region(s) of VU 12. List of active avatars database 56 contains a list of all the avatars that are online in the VU 12, while user database 58 and information database 60 contain information on the actual human users of VU 12. In one embodiment, user database 58 contains general information on the users such as names, email addresses, locales, interests, ages, preferences, etc., while user information database 60 contains additional information on the users such as billing information (e.g., credit card information) for taking part in transactions. In an exemplary embodiment, user database 58 contains information about the priority of each of avatars 38 within region 18 of virtual universe 12. As will be further described below, avatar priority may be used to prioritize access to region 18 in cases of where avatar crowding and performance degradation are possible.

Asset database 62 contains information on the avatars of the users that reside in VU 12. In one embodiment, asset database 62 contains information on the virtual content within the personal inventories of each avatar of the virtual universe. An illustrative but non-limiting listing of the virtual content that can be present in asset database 62 includes avatar accessories (e.g., clothing), virtual pets, vehicles, electronic media (e.g., music files), graphics files, sound files, animations, electronic documents, video files, avatar body parts, avatar tools, calling cards, note cards, photos and photo albums, or any other type of virtual content.

Those skilled in the art will also recognize that databases 56-62 may contain additional information if desired. Databases 56-62 may be consolidated into a single database or table, divided into multiple databases or tables, or clustered into a database system spanning multiple physical and logical devices. Further, although the above information is shown in FIG. 4 as being stored in databases, those skilled in the art will recognize that other configurations and means of storing information can be utilized. For example, databases 56-62 might reside on the same computers as virtual universe client 24, have components that reside on both server 14 and virtual universe client 24, or reside on separate computers in direct communication with virtual universe server 14 and virtual universe client 24.

An avatar transport component 66 enables users to transport, which, as mentioned above, allows avatars to transport through space from one point to another point instantaneously. As a result, an avatar could, for example travel from a business region to an entertainment region to experience a concert.

An avatar management component 68 logs what the avatars are doing while in the virtual universe. For example, avatar management component 68 can determine where each avatar is presently located in the virtual universe, as well as what activities it is performing or has recently performed. An illustrative but non-exhaustive list of activities can include shopping, eating, talking, recreating, etc.

Because a typical virtual universe has a vibrant economy, server 14 has functionalities that are configured to manage the economy. In particular, a universe economy management component 70 manages transactions that occur within the virtual universe between avatars. In one embodiment, VU 12 will have its own VU currency ($VU) that users pay for with real-life money. The users can then take part in commercial transactions for their avatars through universe economy management component 70. For example, a user might want to pay for a service that automatically reduces server load by providing tunnel creation within the virtual universe. In this case, the user (via his/her avatar) would make the purchase of this service using the $VU. In some instances, the user may want to take part in a commercial transaction that benefits him or her and not an avatar. In this case, a commercial transaction management component 72 allows the user to participate in the transaction. For example, while walking around a commercial zone, a user may see a pair of shoes that he or she would like for themselves and not an avatar. In order to fulfill this type of transaction and others similarly related, commercial transaction management component 72 interacts with banks 74, credit card companies 76, and vendors 78.

Figure 5:
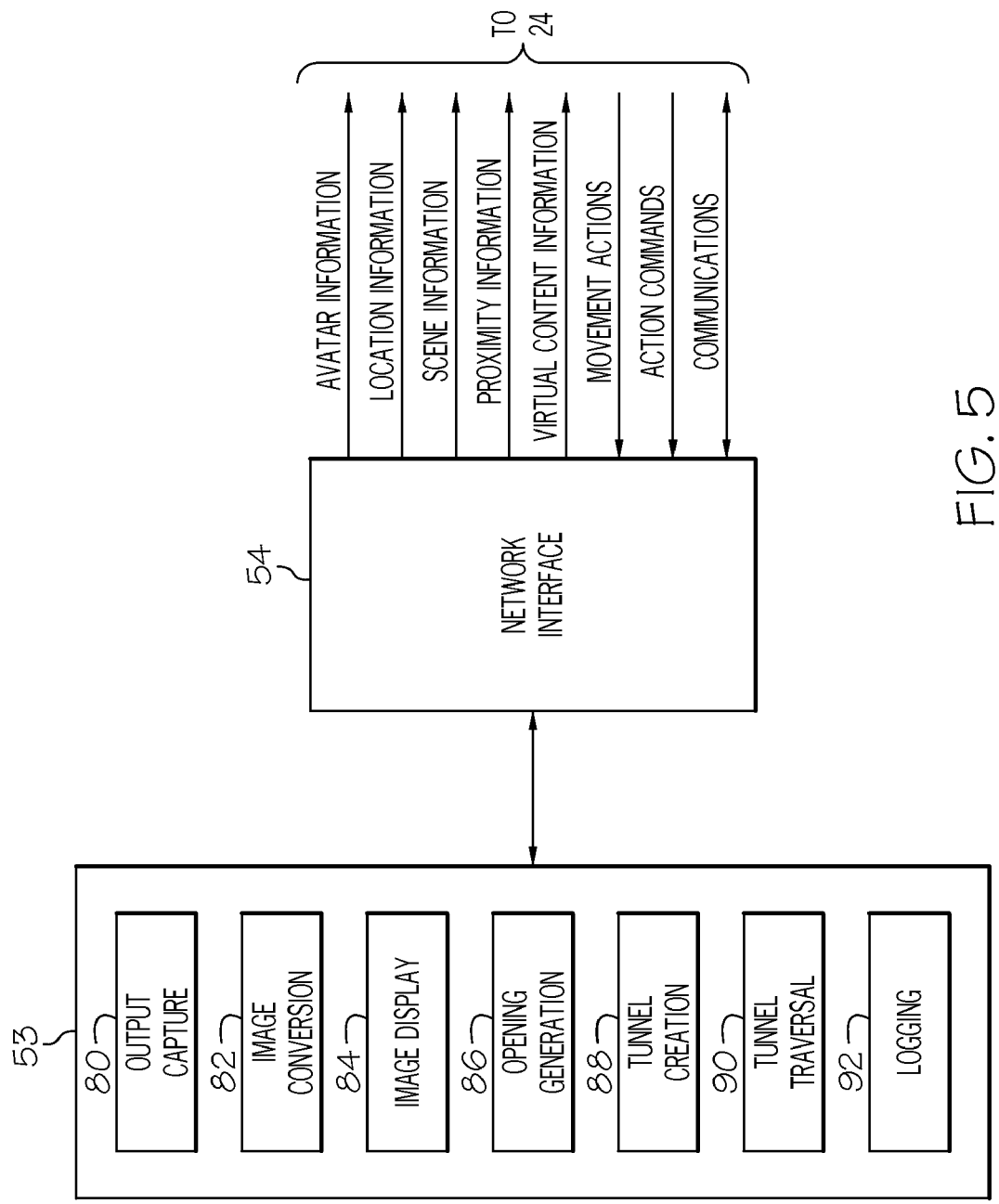
FIG. 5 shows a tunnel creation tool according to one embodiment of this invention that operates in the environment shown in FIG. 1.
Figure 6:
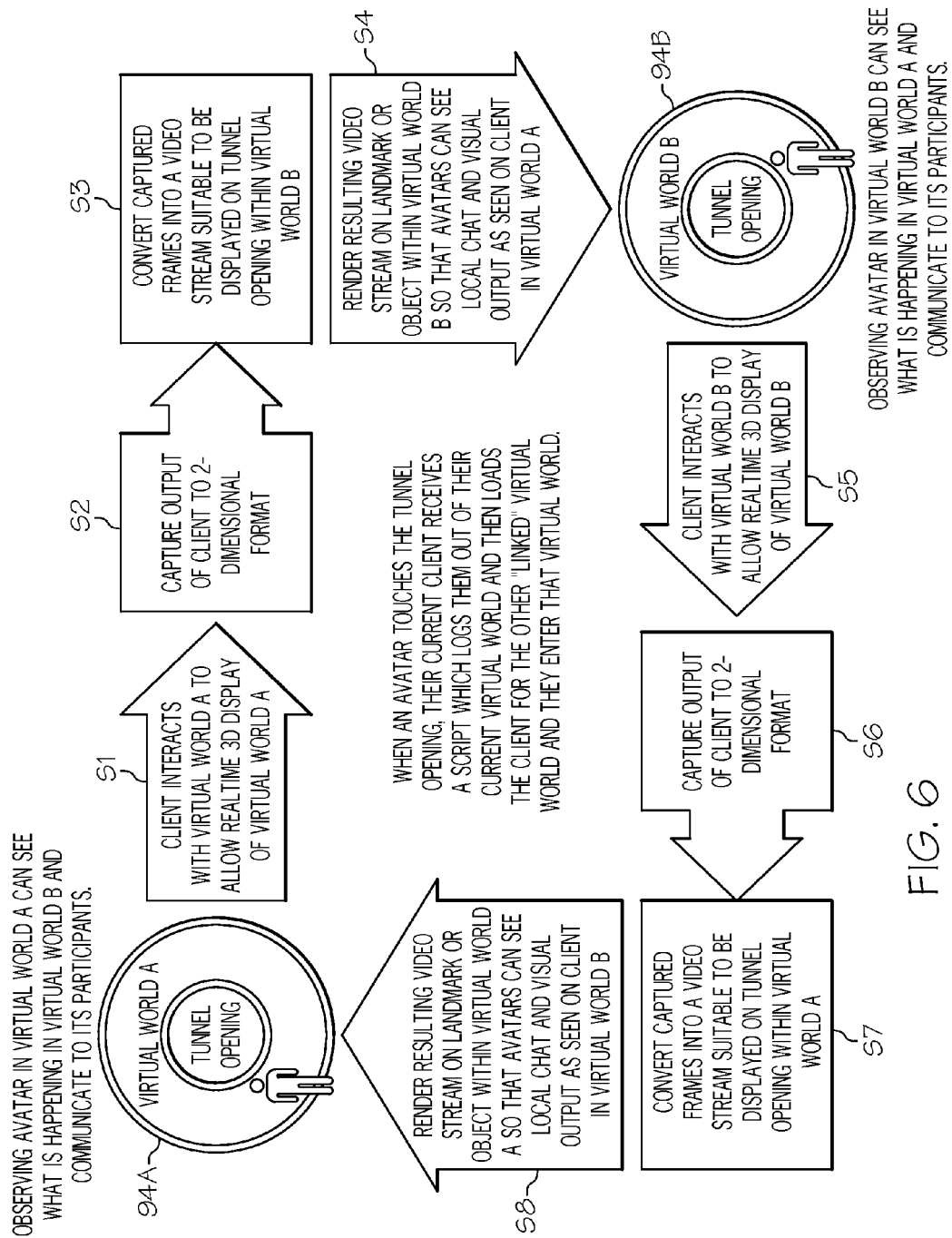
FIG. 6 shows a process flow diagram according to an embodiment of the present invention.

Referring now to FIGS. 5 and 6, tunnel creation tool 53 according to embodiments of the invention will be described in further detail. As shown, tunnel creation tool 53 comprises: output capture component 80; image conversion component 82; image display component 84; opening generation component 86; tunnel creation component 88; tunnel traversal component 90; and logging component 92. It is understood that these components may work in conjunction with and/or leverage any of the other components shown throughout FIGS. 1-7. For example, tunnel traversal component 90 could be or work in conjunction with avatar transport component 66 of FIG. 4.

The functions of these components will now be described in conjunction with the process flow diagram of FIG. 6. In step S1, the client/user interacts with VU A to allow for real-time 3D display of VU A. In step S2, output capture component 80 will capture the 3D output as a 2D image. In step S3, the 2D image will be converted into a frame (e.g., streaming video) via image conversion component 82. In step S4, image display component 84 will display the frame on a landmark in VU A, and opening generation 86 will use the displayed frame to generate a tunnel opening 94A to VU B. This can allow an avatar in VU A to see and communicate with VU B. These steps will be repeated in VU B to create a tunnel between VU A and VU B. Specifically, in step S5, a client/user interacts with VU B to allow for real-time 3D display of VU B. In step S6, output capture component 80 will capture the 3D output as a 2D image. In step S3, the 2D image will be converted into a frame (e.g., streaming video) via image conversion component 82. In step S7, image display component 84 will display the frame on a landmark in VU B, and opening generation 86 will use the displayed frame to generate a tunnel opening 94B to VU A, giving the avatar in VU B the ability to view and/or communicate with VU A. Using these two tunnel openings 94A-B, tunnel creation component 88 will create a tunnel between VU A and VU B.

Should an avatar in either VU A or VU B contact its respective tunnel opening 94A or 94B, tunnel traversal component 90 would detect the contact and transport the corresponding avatar to the other VU via the tunnel. As this occurs, logging component 92 will log the user of the avatar out of the VU that it is leaving and log the user of the avatar into the VU that it is entering via the tunnel. Such logging in and out can be accomplished via a link.

In order to bypass problems with capturing 3D output from a video card device driver, the output is captured from system memory where the pixels are rendered to the screen itself. Buffering can be used to enable uninterrupted streaming video. Text from local conversations within the virtual universe will be carried as part of the picture, thereby enabling avatars to use text-based communication between their virtual universe and the other. By creating an event on an object that displays the tunnel, it is possible to trigger actions to log out the user and provide a link via a URL association to load the new client to enter the other virtual world. This would give the effect of the tunnel transporting the avatar to another world. The user would pre-created avatars in both worlds to be able to do this. Quality of service rules can be used to maintain each computer's bandwidth at a useable size, unaffected by the other video stream traffic, which has similar quality of service rules implemented to allow the same reservation of bandwidth. An acceptable resolution to display video would be 640×480 to 800×600 pixels at a speed of 15-20 frames per second.

In another embodiment of this invention, tunnel creation tool 53 is used as a service to charge fees for providing tunnel creation in the virtual universe. Along these lines, although not shown in FIG. 5, tunnel creation tool 53 could further comprise a transaction component configured to charge a fee for providing the tunnel creation and/or allowing traversal there-through. In this embodiment, the provider of the virtual universes or the third party service providers could offer this transaction as a service by performing the functionalities described herein on a subscription and/or fee basis. In this case, the providers of the virtual universes or the third party service providers can create, deploy, maintain, support, etc., tunnel creation tool 53 that performs the processes described in the invention. In return, the virtual universes or the third party service providers can receive payment from the virtual universe residents via universe economy management component 70 and commercial transaction management component 72 (FIG. 4).

In still another embodiment, the methodologies disclosed herein can be used within a computer system to provide tunnel creation in a virtual universe. In this case, tunnel creation tool 53 can be provided, and one or more systems for performing the processes described in the invention can be obtained and deployed to a computer infrastructure. To this extent, the deployment can comprise one or more of: (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 7:
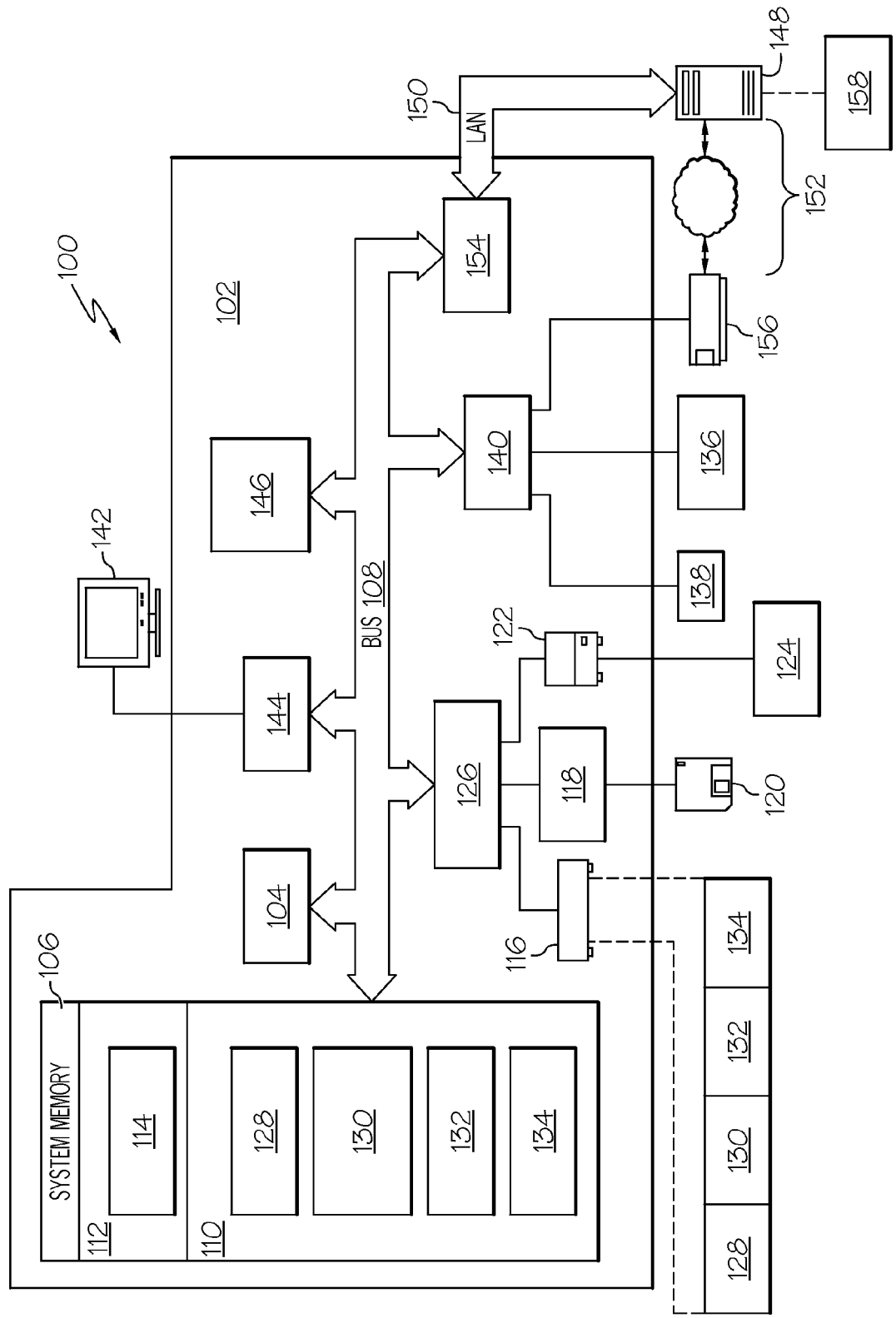
FIG. 7 shows a schematic of an exemplary computing environment in which elements of the networking environment shown in FIG. 1 may operate.

FIG. 7 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should computing environment 100 be interpreted as having any dependency relating to any one or combination of components illustrated in FIG. 7.

In the computing environment 100 there is a computer 102, which is operational with numerous other general purpose or special purpose computing system environments or configurations. Examples of well-known computing systems, environments, and/or configurations that may be suitable for use with computer 102 of the present invention include, but are not limited to, personal computers, server computers, thin clients, thick clients, hand-held or laptop devices, cellular telephones, personal digital assistants (PDA), multiprocessor systems, microprocessor-based systems, set top boxes, programmable consumer electronics, network PCs, minicomputers, mainframe computers, distributed computing environments that include any of the above systems or devices, and the like.

Computer 102 may be described in the general context of computer-executable instructions, such as program modules, being executed by a computer. Generally, program modules include routines, programs, objects, components, logic, data structures, and so on, that perform particular tasks or implement particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 7, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 7, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 7 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. Hard disk drive 116, magnetic disk drive 118, and optical disk drive 122 are each connected to bus 108 by one or more data media interfaces 126.

The drives and their associated computer-readable media provide non-volatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example and not limitation, an operating system 128, one or more application programs 130, other program modules 132, and program data 134. Each of the operating system 128, one or more application programs 130, other program modules 132, and program data 134 or some combination thereof, may include an implementation of the networking environment 10 of FIG. 1 including server 14 and virtual universe client 24. In one embodiment, the one or more application programs 130 include components of tunnel creation tool 53.

The one or more program modules 130 carry out the methodologies disclosed herein, as shown in FIG. 6. The flowchart of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 7, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 7 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to system bus 108 via the user input interface 140 or other appropriate mechanism.

In a networked environment, program modules depicted relative to the personal computer 102, or portions thereof, may be stored in a remote memory storage device. By way of example, and not limitation, FIG. 7 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, RF, etc., or any suitable combination of the foregoing.

It is apparent that there has been provided with this invention an approach for providing a tunnel creation in a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for creating a tunnel between virtual universes (VUs), comprising:
    capturing a first 3-dimensional output from a first computer connected to a first VU as a first 2-dimensional screen image;
    converting the first 2-dimensional screen image into a first frame;
    displaying the first frame on a first landmark in the first VU; and
    generating a first tunnel opening to a second VU using the first frame as displayed on the first landmark.

2. The method of claim 1, further comprising:
    capturing a second 3-dimensional output from a second computer connected to the second VU as a second 2-dimensional screen image;
    converting the second 2-dimensional screen image into a second frame;
    displaying the second frame on a second landmark in the second VU;
    generating a second tunnel opening to the first VU using the second frame as displayed on the second landmark; and
    creating a tunnel between the first tunnel opening and the second tunnel opening.

3. The method of claim 2, the tunnel configured to:
    provide a view of the second VU from the first VU;
    provide a view of the first VU from the second VU; and
    allow avatars to travel between the first VU and the second VU.

4. The method of claim 2, further comprising:
    detecting contact by an avatar in the first VU with the tunnel; and
    transporting the avatar to the second VU via the tunnel in response to the contact.

5. The method of claim 4, further comprising:
    logging a user associated with the avatar out of the first VU; and
    logging the user into the second VU.

6. The method of claim 5, the user being logged out of the first VU and logged into the second VU via a link.

7. The method of claim 1, the first frame and the second frame being embodied in a streaming video format.

8. A system for creating a tunnel between virtual universes (VUs), comprising:
    a bus;
    a processor coupled to the bus; and
    a memory medium coupled to the bus, the memory medium comprising instructions to:
        capture a first 3-dimensional output from a first computer connected to a first VU as a first 2-dimensional screen image;
        convert the first 2-dimensional screen image into a first frame;
        display the first frame on a first landmark in the first VU; and
        generate a first tunnel opening to a second VU using the first frame as displayed on the first landmark.

9. The system of claim 8, the memory medium further comprising instructions to:
    capture a second 3-dimensional output from a second computer connected to the second VU as a second 2-dimensional screen image;
    convert the second 2-dimensional screen image into a second frame;
    display the second frame on a second landmark in the second VU;
    generate a second tunnel opening to the first VU using the second frame as displayed on the second landmark; and
    create a tunnel between the first tunnel opening and the second tunnel opening.

10. The system of claim 9, the tunnel configured to:
    provide a view of the second VU from the first VU;
    provide a view of the first VU from the second VU; and
    allow avatars to travel between the first VU and the second VU.

11. The system of claim 9, the memory medium further comprising to:
    detect contact by an avatar in the first VU with the tunnel; and
    transport the avatar to the second VU via the tunnel in response to the contact.

12. The system of claim 11, the memory medium further comprising instructions to:
    log a user associated with the avatar out of the first VU; and
    log the user into the second VU.

13. The system of claim 12, the user being logged out of the first VU and logged into the second VU via a link.

14. The system of claim 8, the first frame and the second frame being embodied in a streaming video format.

15. A non-transitory computer readable storage medium having stored thereon a computer program product for creating a tunnel between virtual universes (VUs), when executed by a computer to:
    capture a first 3-dimensional output from a first computer connected to a first VU as a 2-dimensional screen image;
    convert the first 2-dimensional screen image into a first frame;
    display the first frame on a first landmark in the first VU; and
    generate a first tunnel opening to a second VU using the first frame as displayed on the first landmark.

16. The computer program product of claim 15, further comprising program instructions stored on the computer readable storage medium to:
    capture a second 3-dimensional output from a second computer connected to the second VU as a second 2-dimensional screen image;
    convert the second 2-dimensional screen image into a second frame;

display the second frame on a second landmark in the second VU;
generate a second tunnel opening to the first VU using the second frame as displayed on the second landmark; and
create a tunnel between the first tunnel opening and the second tunnel opening.

17. The computer program product of claim 16, the tunnel configured to:
provide a view of the second VU from the first VU;
provide a view of the first VU from the second VU; and
allow avatars to travel between the first VU and the second VU.

18. The computer program product of claim 16, further comprising program instructions stored on the computer readable storage media to:
detect contact by an avatar in the first VU with the tunnel; and
transport the avatar to the second VU via the tunnel in response to the contact.

19. The computer program product of claim 18, further comprising program instructions stored on the computer readable storage media to:
log a user associated with the avatar out of the first VU; and
log the user into the second VU.

20. The computer program product of claim 19, the user being logged out of the first VU and logged into the second VU via a link.

21. The computer program product of claim 15, the first frame and the second frame being embodied in a streaming video format.

22. A method for deploying a system for creating a tunnel between virtual universes (VUs), comprising:
providing a computer infrastructure having functionality to:
capture a first 3-dimensional output from a first computer connected to a first VU as a first 2-dimensional screen image;
convert the first 2-dimensional screen image into a first frame;
display the first frame on a first landmark in the first VU; and
generate a first tunnel opening to a second VU using the first frame as displayed on the first landmark.

23. The method of claim 22, the computer infrastructure further having functionality to:
capture a second 3-dimensional output from a second computer connected to the second VU as a second 2-dimensional screen image;
convert the second 2-dimensional screen image into a second frame;
display the second frame on a second landmark in the second VU;
generate a second tunnel opening to the first VU using the second frame as displayed on the second landmark; and
create a tunnel between the first tunnel opening and the second tunnel opening.

* * * * *